United States Patent [19]

Bucher

[11] Patent Number: 5,749,193
[45] Date of Patent: May 12, 1998

[54] IMPACT WALL ELEMENT

[75] Inventor: Peter Bucher, Pfäffikon, Switzerland

[73] Assignee: Bucher Leichtbau AG, Fällanden, Switzerland

[21] Appl. No.: 528,237

[22] Filed: Sep. 14, 1995

[30] Foreign Application Priority Data

Sep. 18, 1994 [CH] Switzerland .................. 02821/94

[51] Int. Cl.⁶ .................................................. B60R 21/055
[52] U.S. Cl. ..................... 52/506.06; 52/309.9; 52/480; 52/508; 280/751
[58] Field of Search .................... 280/751; 52/506.06, 52/508, 480, 309.9

[56] References Cited

U.S. PATENT DOCUMENTS

| | | | |
|---|---|---|---|
| 2,606,755 | 8/1952 | Samuels | 280/751 X |
| 3,224,924 | 12/1965 | von Ardenne et al. | |
| 3,493,244 | 2/1970 | Bozich | |
| 3,810,656 | 5/1974 | Fox et al. | |
| 3,834,482 | 9/1974 | Wada et al. | |
| 3,843,155 | 10/1974 | Foster | |
| 3,893,275 | 7/1975 | Omholt | 52/508 X |
| 3,929,948 | 12/1975 | Welch et al. | |
| 3,989,275 | 11/1976 | Finch et al. | 280/751 |
| 4,042,057 | 8/1977 | Beckley | |
| 4,893,521 | 1/1990 | Ishida et al. | |
| 5,096,223 | 3/1992 | Tekelly et al. | |
| 5,141,279 | 8/1992 | Weller | 280/751 X |
| 5,154,445 | 10/1992 | Weller | 280/751 |
| 5,370,417 | 12/1994 | Kelman et al. | |

FOREIGN PATENT DOCUMENTS

| | | |
|---|---|---|
| 0521223 | 1/1993 | European Pat. Off. |
| 2434175 | 2/1975 | Germany |
| 940243 U | 4/1994 | Germany |
| 60-222345 | 11/1985 | Japan |

OTHER PUBLICATIONS

Automotive Technologies International; DynaPad—Air Damped Padding; (see System II), Apr. 1991.

*Primary Examiner*—Christopher Kent
*Attorney, Agent, or Firm*—Mcaulay Fisher Nissen Goldberg & Kiel, LLP

[57] ABSTRACT

The impact wall element (1) for gentle deceleration of a human body impacting an obstacle has a two-zone structure. The first zone comprises a lightweight, plastically deformable sandwich cover plate (10) with two thin cover layers (11, 12) and an intermediately positioned, lightweight, deformable support core (13). In the second zone are provided discreet, spaced, plastically deformable spacing elements (21), which carry the cover plate and are supported on a fixed substrate (5). The thickness D2 of the second zone is more than twice the thickness D1 of the first zone. The lightweight wall element leads to a gentle interception on the shortest possible path, particularly in the case of a head impact in motor vehicles or aircraft.

23 Claims, 10 Drawing Sheets

IMPACT WALL ELEMENT

The invention relates to an impact wall element for the gentle deceleration of a human body impacting against an object and in particular a head impact in motor vehicles or aircraft. In the case of accidents of passenger vehicles, e.g. in collisions, overturning, emergency braking or emergency landings of aircraft, pronounced movement changes take place to the vehicle, so that the occupants strike against the inner boundaries of the passenger area. For example, in the case of strapped in passengers in aircraft, the upper body and in particular the head in the case of powerful aircraft braking, is hurled forwards and can strike e.g. against partition walls or front seats. Therefore wall elements are sought for exposed locations, which can provide a very gentle and injury-avoiding interception of impacting passengers. This generally applies for the case where a human body encounters an obstacle at a relatively high speed. This can also occur in stationary installations, where there is a problem of gently absorbing falls and avoiding injuries caused by falls.

Various wall elements and paddings made from foam materials are known, but they generally have an unfavourable, progressive springiness and lead to a relatively poor utilization of the available space. In addition, honeycomb structures have been proposed, but are generally too stiff and also have an unfavourable, non-contact-secure surface. The problem of the impact of human bodies has e.g. been discussed in "Design of a Pedestrian Compatible Car Front"; Gaegauf, Kaeser, Meyer, Reif in "International Research Committee on the Biomechanics of Impact"; Conference Proceedings 1986, p 205. However, the subject involved is different, namely the investigation and reduction of the high injury risk for pedestrians when striking the relatively hard and stiff front of cars. Consequently no suitable solution is offered for the present set problem and instead the compatibility limits of the human body in the case of accidents or impacts are explained. The use of an air bag is also investigated in detail, but can only be used to a limited extent and is also very expensive.

The problem of the present invention is to provide a universally usable, lightweight impact wall element, which overcomes the disadvantages of hitherto known constructions and which with limited wall thickness and construction volume and over a very short path leads to a gentle, injury-preventing braking or deceleration of an impacting human body, particularly in the case of head impact. The wall element must also be simple and inexpensive to manufacture, whilst having a touch-resistant surface and favourable fire and toxicity characteristics.

When correspondingly designed, the wall element is to be usable for an impact at high speed, e.g. in vehicles, as well as at lower speeds in stationary installations.

Briefly, the invention provides an impact wall element which provides for a gentle deceleration of a human body impacting with an obstacle, particularly a head impact in a motor vehicle or aircraft.

In accordance with the invention, the impact wall element has at least two zones.

A first zone is formed from a lightweight deformable sandwich cover plate having a thin outer cover layer, an inner cover layer and an intermediate lightweight deformable support core having cavities between the two layers. The second zone is formed of discretely spaced plastically deformable spacing elements, each of which is disposed between the first zone and a fixed substrate to transfer impact forces on the first zone to the substrate while plastically deforming. The thickness of the second zone is made at least twice the thickness of the first zone.

In use, the cover layers of the deformable sandwich cover plate serve to transmit the impact forces along these layers to the plastically deformable spacing elements.

The deformable structural elements of the wall, i.e. the sandwich cover plate with cover layers and support core, as well as the spacing elements cooperate in such a way that there is an optimum, gentle deceleration over the shortest possible path.

These and other objects and advantages of the invention will become more apparent from the following detailed description taken in conjunction with the accompanying drawings wherein:

FIG. 12 graphically illustrates the possible force courses over a deformation path of the impact wall element of FIG. 11a;

FIG. 14b illustrates a side view of the partition wall of FIG. 14a;

Figure 1A:
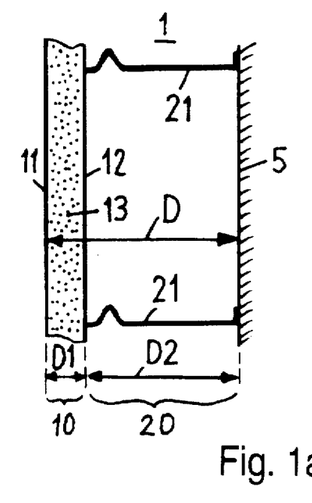
FIG. 1a illustrates a part cross-sectional view through an impact wall element constructed in accordance with the invention.
Figure 1B:
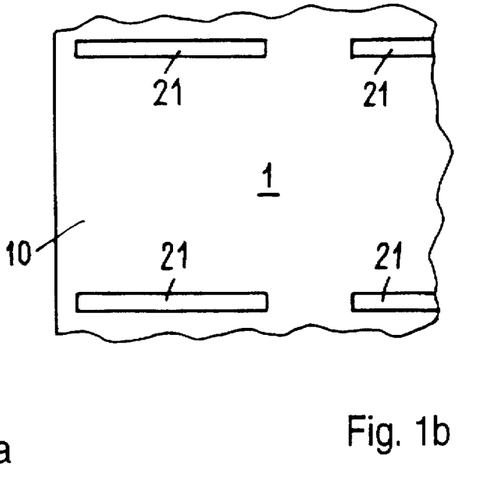
FIG. 1b illustrates a backside view of the wall element of FIG. 1a illustrating the discretely positioned plastically deformable elements relative to the first zone of the impact element.

The structure of the impact wall element 1 according to the invention is illustrated in two views in FIGS. 1a/b. The wall element has a two-zone structure, the first zone comprising a lightweight, plastically deformable sandwich cover plate or shell 10. The latter has a lightweight, deformable support core 13 with cavities between an upper cover layer 11 and a lower cover layer 12. The second zone 20 has plastically deformable spacing elements 21, which are arranged in spaced manner and are discrete and uniformly distributed over the surface of the wall element 1. The spacing elements 21 carry the cover plate 10 and are supported on a fixed support or substrate 5, e.g. in the form of a solid wall or on a frame (FIG. 14). The thickness D2 of the second zone 20 is more than twice the thickness D1 of the first zone 10. Preferably the thickness D2 is three to ten times the thickness D1. FIG. 1b shows a plan view detail of the wall element 1 with four individual, spaced spacing elements 21. The thickness of the entire wall element 1 is D=D1+D2.

Figure 2A:
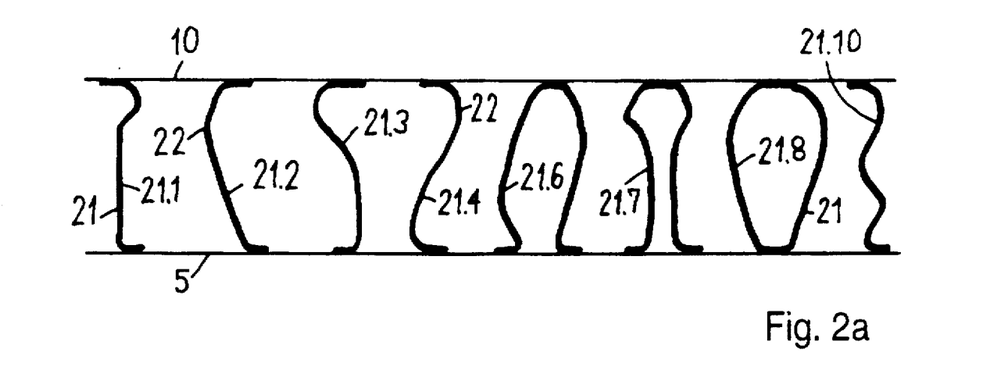
FIG. 2a illustrates a cross-sectional view of an arrangement of deformable spacing elements constructed in accordance with the invention.
Figure 2B:
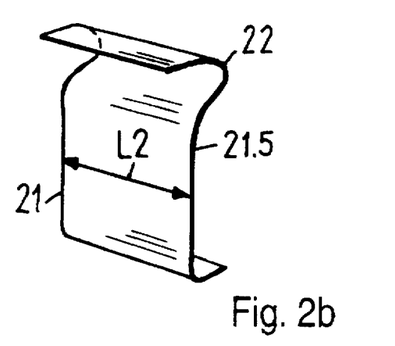
FIG. 2b illustrates a spacing element constructed in accordance with the invention.
Figure 2C:
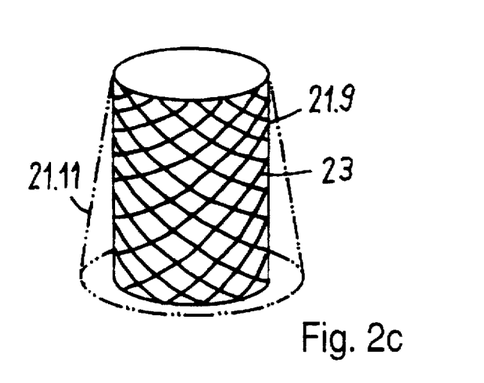
FIG. 2c illustrates a columnar spacing element constructed in accordance with the invention.

FIGS. 2a/b/c show different embodiments of spacing elements. Preferably they are shaped in such a way that also in the case of an impact directly and perpendicularly on a spacing element or on the cover plate there are no characteristic force peaks at the start of the deformation. This is e.g. made possible by a precompression point or bend 22. FIG. 2a shows in cross-section examples of wall-like, flat spacing elements 21.1 to 21.4, as well as two examples of arcuate elements 21.6 and 21.7, a tubular spacing element 21.8 and an element 21.10 with multiple, undulatory bends. FIG. 2b shows an example of a sheet-like spacing element 21.5 with a precompression bend 22, which in principle represents a short construction with a length L2 of the wall-like element 21.1. FIG. 2c shows an example of a columnar spacing element 21.9, which is e.g. formed from cylindrically positioned expanded metal 23, which can also be given a conical shape 21.11.

Figure 3A:
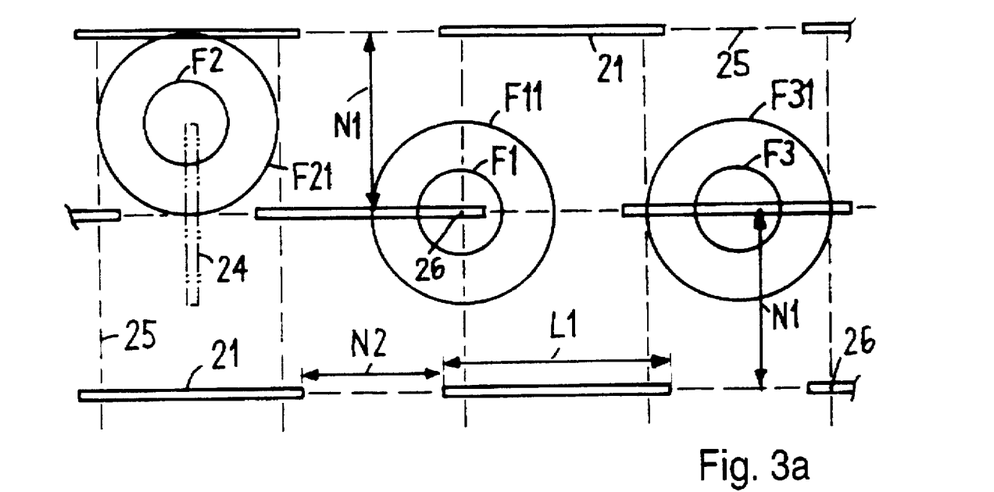
FIG. 3a illustrates one arrangement of the spacing elements of a wall element in accordance with the invention.
Figure 3B:
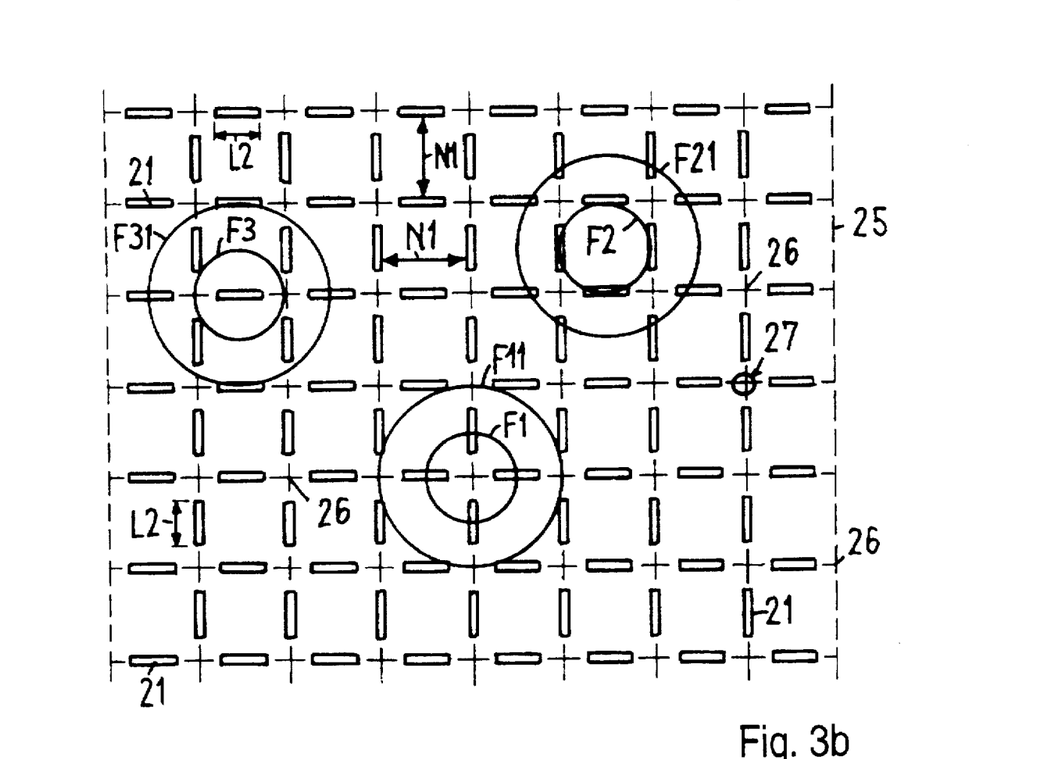
FIG. 3b illustrates a second embodiment of an arrangement of spacing elements in accordance with the invention.
Figure 4A:
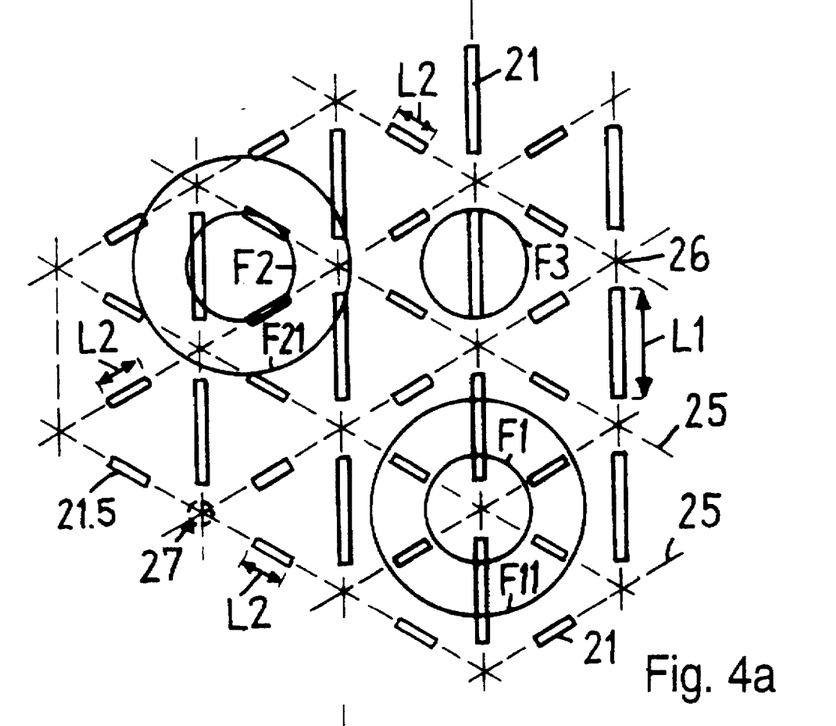
FIG. 4a illustrates a grid of spacing elements in accordance with the invention.
Figure 4B:
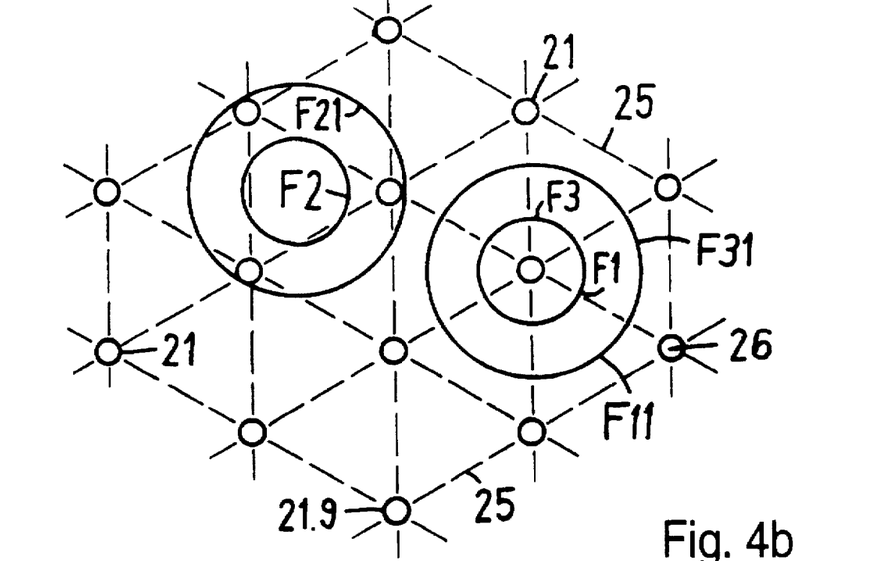
FIG. 4b illustrates a modified grid arrangement of spacing elements in accordance with the invention.
Figure 5:
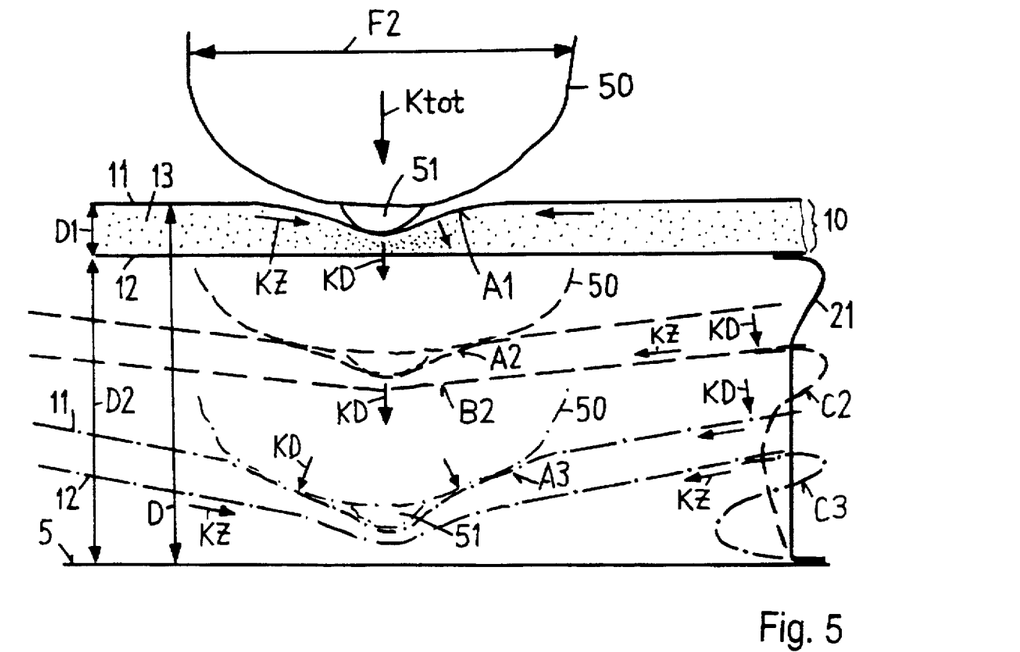
FIG. 5 graphically illustrates an impact of a head against a wall element in accordance with the invention.

FIGS. 3a, 3b, 4a and 4b show examples of arrangements of the spacing elements 21, i.e. their distribution over the surface of the wall element 1. The spacing elements are so uniformly distributed over said surface, that a very uniform deformation resistance is obtained over the entire surface of the wall element, i.e. at each point there is a very uniform, optimum deceleration of an impacting human body and specifically in the case of a head impact. For this purpose the spacing elements here are arranged in the form of a regular netting or grid pattern 25 with grid points 26. FIGS. 4a and 4b show a 60° grid and FIGS. 3a and 3b an example with a square grid pattern. In FIG. 3a relatively long, wall-like spacing elements 21 are arranged in parallel rows. The spacing N1 between the rows is greater than the spacing N2 between the spacing elements in a row and the length L1 of the spacing elements is greater than N1. Thus, with relatively large spacings N1 of e.g. 30 cm and more, a good force compensation is obtained. Three different points of a possible head impact are illustrated by circles:

impact on a grid point 26 with circles F1, F11,
impact in the centre of a grid mesh with circles F2, F21,
in the centre of a spacing element 21 with the circles F3, F31.

The 15 cm diameter circles F1, F2, F3 correspond to the contact surface with an impacting head. The diameter 30 cm circles F11, F21 and F31 indicate the surrounding area. The force influence of the spacing elements in the vicinity can in this way be estimated or established. The closer to the impact point a spacing element is located, the greater its contribution to the overall deformation resistance.

FIG. 3b shows a square arrangement with smaller grid constants N1 of e.g. 15 cm, so as to be able to obtain a very uniform force distribution of the spacing elements 21 over the entire wall element surface. The spacing elements are here regularly arranged in longitudinal and transverse rows, their length L2 here being e.g. half as large as the grid constant N1. It is very important for the spacing elements to be arranged in junction-free manner 27, i.e. in such a way that between said elements a spacing is always maintained and consequently longitudinally and transversely directed spacing elements do not form a junction in a grid point, so as to bring about a greatly increased deformation resistance at said point.

FIG. 4a shows spacing elements 21 of different size and in one grid direction are provided spacing elements with a greater length L1 and in the two other directions elements with a smaller length L2 arranged in a regular manner. As illustrated by the circles of the impact surfaces F1, F2, F3 and F11, F21, in this way a compensation of the deformation force amounts of the closest spacing elements can be obtained. Independently of the impact point this brings about a substantially equal deformation resistance. In FIG. 4b in the grid points 26 are provided columnar spacing elements 21.9, as are e.g. shown in FIG. 2c. Here again the arrangement is junction-free, because all the spacing elements are uniformly spaced here. The choice of the arrangement of the spacing elements is a function of the nature of the fixed substrate 5 on which the impact wall element is supported. A frame 45 according to FIG. 14 requires very wide spacings N1 between the elements 21, whereas it is also possible to choose narrow spacings N1 on a fixed wall, floor, base, etc. (FIG. 3b), e.g. N1 being roughly the same size as the thickness D of the wall element 1. In the case of large spacings N1 an additional force compensation can be achieved by reinforcing sections 24 fitted to the cover plate 10, as shown in FIGS. 3a and 14.

Hereinafter a description will be given of the impact mechanism and the function of the wall structure according to the invention, i.e. the function of the individual structural elements, the sandwich cover plate 10 with cover layers 11, 12 and core 13, the spacing elements 21, as well as their interaction by reference to FIGS. 5 to 9. The deformation forces of the different elements of the impact wall are adapted to the human body with respect to the deformation characteristics and the local occurrence of deformation forces. The adaptation to the shape of an impacting body part is brought about by the cover plate with the two cover layers. This is explained according to FIG. 5 in the case of a head impact with a narrowly localized projecting point such as a nose or chin. The small-surface projecting exposed point, in this case the nose 51, contacts the upper cover layer and is decelerated on a deformation path of approximately 1 cm essentially by the deformation resistance and the local diaphragm or membrane forces of the upper cover layer 11, then being absorbed by compressive forces of the sandwich core 13 and finally by the deformation and membrane forces of the lower cover layer 12.

The forces of the upper cover layer are designated A, those of the lower cover layer B and those of the spacing element C. At the start of the impact forces A1 of the upper cover layer 11 occur first and give the first shape adaptation to the nose 51. Subsequently with deeper penetration increasingly forces B of the lower cover layer 12 occur. In the represented second deformation position of FIG. 5 these forces B2 are in addition to the forces A2 of the upper cover layer, as well as the forces C2. With further penetration, forces C of the spacing element s 21 increasingly come into action. In the represented third deformation position, there are forces C3 in addition to forces A3 and B3. The directions of the membrane forces of the cover layers 11 and 12 are e.g. indicated with KZ for tensile forces and KD for compressive forces. The impact surface F2 of the head 50 acts with increasing penetration depth, i.e. the contact surface becomes larger. With increasing deformation path and contact surface of the head 50 with the cover plate, crushing and bending forces of the nearest spacing elements occur, together with increasing membrane forces of the cover plate. As the deformation path progresses, further extending membrane forces and deformation forces of further adjacent spacing elements come into effect. This leads to a multiphase deformation configuration with the superimposing of forces A of the upper cover layer, B of the lower cover layer or the complete sandwich plate and C of the spacing elements over the deformation path W (cf. FIG. 8).

Figure 6:
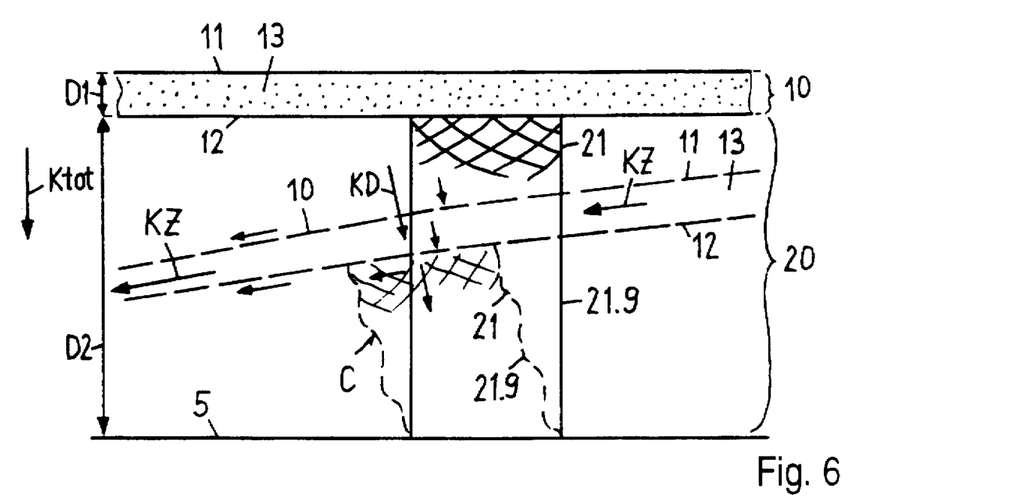
FIG. 6 graphically illustrates the forces occurring in the case of an impact on a wall element constructed in accordance with the invention.
Figure 7A:
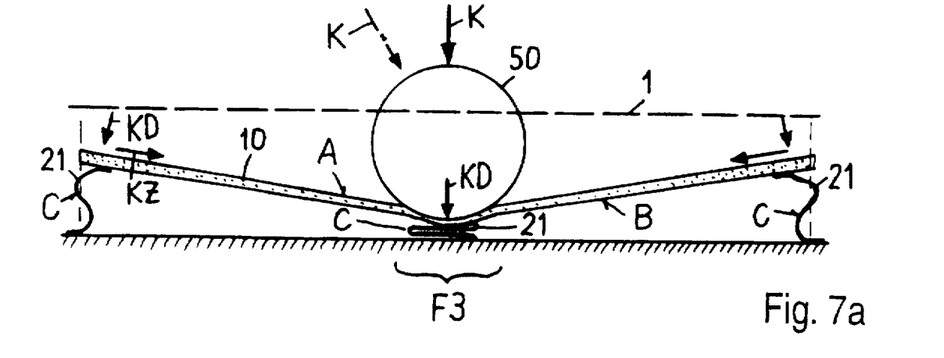
FIG. 7a schematically illustrates an impact against a wall element constructed in accordance with the invention.
Figure 7B:
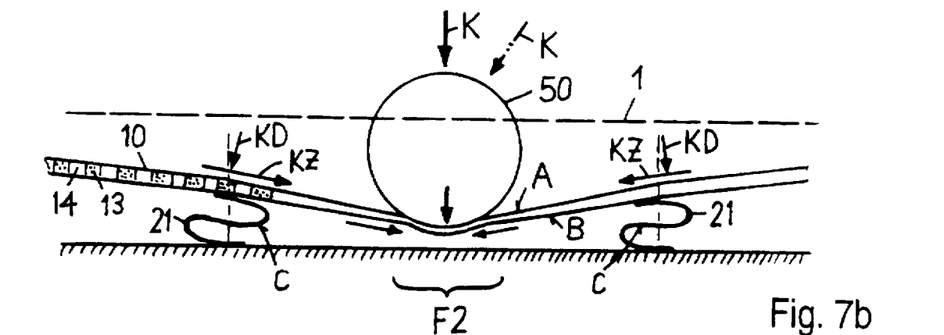
FIG. 7b illustrates a second form of impact against a wall element constructed in accordance with the invention.

FIG. 6 illustrates the forces $K_s$, $K_{tot}$ or energies in the case of an impact, which does not take place here directly on a spacing element, which are exerted on a spacing element 21 and absorbed by the latter by deformations (cf. FIG. 7b). By means of the sandwich cover plate 10, membrane forces, i.e. tensile forces KZ and compressive forces KD, are transferred to the spacing element 21. This is illustrated here with a columnar spacing element 21.9, which is crushed and bent by the forces C. Compared with the starting position, the sandwich cover layer with core 13 and a thickness D1 is also compressed or crushed by the compressive forces KD.

The interaction of the forces A, B, C of the sandwich cover layer 10 and the spacing elements 21, as well as the resulting deformations, are further illustrated by FIGS. 7a/b. In FIG. 7a the impact occurs directly on a spacing element 21, which consequently following the crushing of the cover plate 10 and its core 13 is also crushed by the compressive forces KD. In FIG. 7b the impact occurs between two spacing elements 21 (FIGS. 7a and 7b corresponding to examples with impact surfaces F3 and F2 in FIGS. 3/4). The membrane forces of the cover layers 11, 12 transfer impact forces to the two adjacent spacing elements 21. Roughly speaking these two spacing elements are compressed or crushed half as much as the central spacing element of FIG. 7a. The deformation resistance in both cases of FIG. 7a and FIG. 7b is roughly the same. The impact wall according to the invention is so designed as regards construction, material selection and dimensioning that it complies in the best possible manner with the explained function mechanisms. In order to attain low mass inertia forces with high impact speeds, the entire structure and in particular the cover plate has a lightweight construction. Suitable materials are tough light metals such as aluminium alloys, e.g. Ac 110, with high specific deformation energy absorption, as well as long and continuous fibre composites such as glass and aramid fibre-reinforced plastics.

The sandwich cover plate 10 is relatively soft and is not flexurally strong, so that its cover layers 11, 12 are locally slightly displaceable against one another. (The known, very flexurally strong standard honeycomb plates, whose honeycombs are very firmly bonded to the cover layers are absolutely unsuitable here.) The sandwich core 13 and its connection to the cover layers e.g. by weak bonding or adhesion is such that only over a surface area of several dm$^2$ are noticeable shearing forces transferred from the upper cover layer 11 to the lower cover layer 12. Thus, the upper cover layer can virtually alone absorb the initial local deformations, independently of the lower cover layer. The sandwich core of the cover plate is also locally crushable by more than 50%. Over distances of 1 dm and more, the sandwich core transfers shearing forces from the upper cover layer to the lower cover layer and therefore its membrane forces to adjacent spacing elements. Thus, more specifically, the cover layers form a loosely coupled, double network, which transfers the forces to the spacing elements and simultaneously relatively softly absorbs a local initial deformation. The spacing elements are so constructed and arranged that they are uniformly deformable, i.e. crushable and bendable.

The thicknesses of the cover layers are preferably in a range below 1 mm, e.g. 0.4 to 0.7 mm. As a function of the desired force course A, B according to FIG. 8, upper and lower cover layers can have a different construction with respect to the thickness and material, e.g. can be 0.4 and 0.6 mm thick or can be made from aluminium and aramid composite.

The arrangement of the spacing elements is junction-free and uniformly distributed, so that the summated bending and crushing forces of the adjacent spacing elements are roughly the same for all impact points. The entire impact wall structure 1 is crushable at any point by more than 80% and preferably by at least 90%.

Figures 7C, 8:
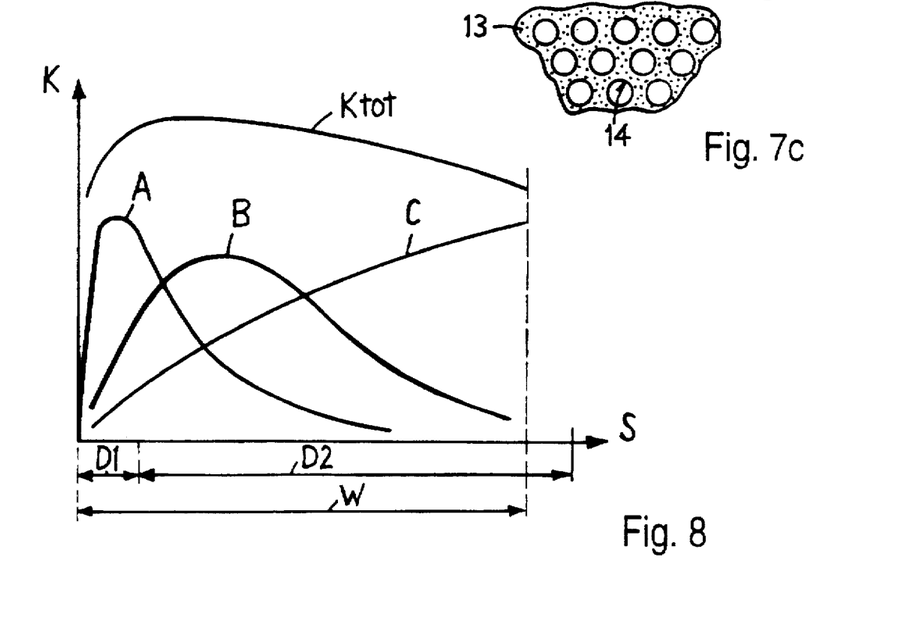
FIG. 7c illustrates a part cross-sectional view of a deformable support core utilized in the first zone of a wall impact element in accordance with the invention.
FIG. 8 graphically illustrates the forces occurring as a function of the deformation path on a wall element constructed in accordance with the invention.

The lightweight sandwich core 13 preferably has an empty volume proportion of at least 90%. It can be made from foams or e.g. from fine, precompressed tubular structures. The core can also have gaps, can be perforated in screen-like manner, can be grid or strip-like, as is illustrated in FIGS. 7b and 7c with respect to a foam core having holes 14. Its density is preferably 40 to 80 kg/m$^3$.

The cooperation of the forces A, B, C of the upper cover layer, lower cover layer and spacing elements is illustrated in FIG. 8, where the forces A, B, C, as well as the resulting impact force $K_{tot}$ is plotted as a function of the deformation path. The force A of the upper cover layer 11 initially rapidly rises and then falls in the vicinity of the first zone D1. The rise and fall of the force B of the lower cover layer 12 is much more flat or shallow, whereas the force C of the spacing elements 21 rises relatively continuously. The height and shape of the force courses A and B are influenceable and therefore adjustable by the dimensioning and characteristics of the cover layers 11, 12, as well as the strength of the core 13 and its connection to the cover layers. The resulting force $K_{tot}$ acting on the impacting body is preferably such as is explained hereinafter relative to FIGS. 10 to 12.

Figure 9:
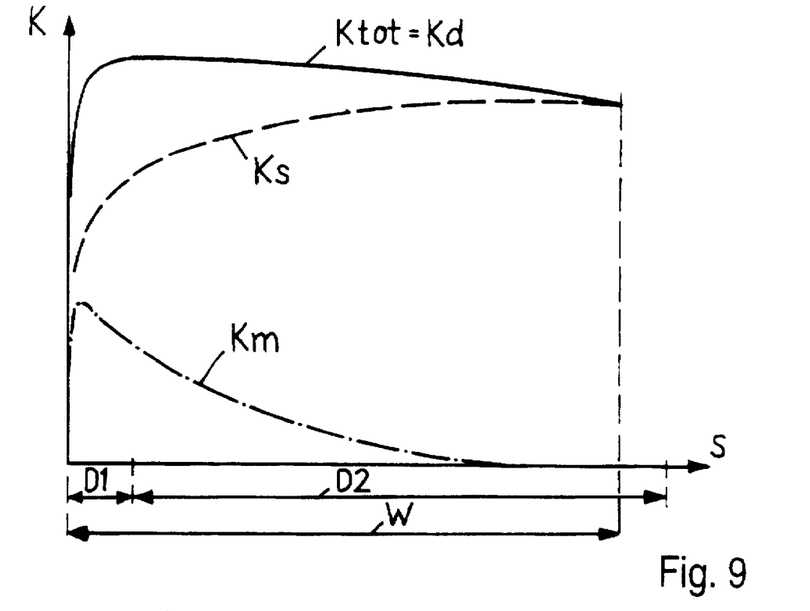
FIG. 9 graphically illustrates the static deformation forces and mass inertia forces occurring on an impact element during an impact.

FIG. 9 illustrates the contribution of the mass inertia forces Km in the function of the deformation path s at higher impact speeds. At the start of impact the force Km reaches a peak value, corresponding to the then locally strongly accelerated part of the cover plate 10 in the vicinity of the impact. The force Km then drops rapidly. The purely static deformation force Ks also initially rapidly reaches a relatively high value and then has a relatively flat configuration. This path can also rise slightly, as in the example of FIG. 9, which together with the decreasing force Km gives a favourable course of the total deformation force $Kd=K_{tot}$=dynamic (total) deformation forces=Km+Ks. The dynamic deformation resistance of the element for a spherical pressure surface with a diameter of 15 cm (which is the size of a human head) is between 2 and 4 kN. In the case of quasi-static uses with limited impact speeds V, as is the case in FIG. 16, where the inertia forces Km are negligibly small, it is also possible to set a slightly falling course of $Ks=K_{tot}$ as the sum of the forces A, B, C.

Figure 10A:
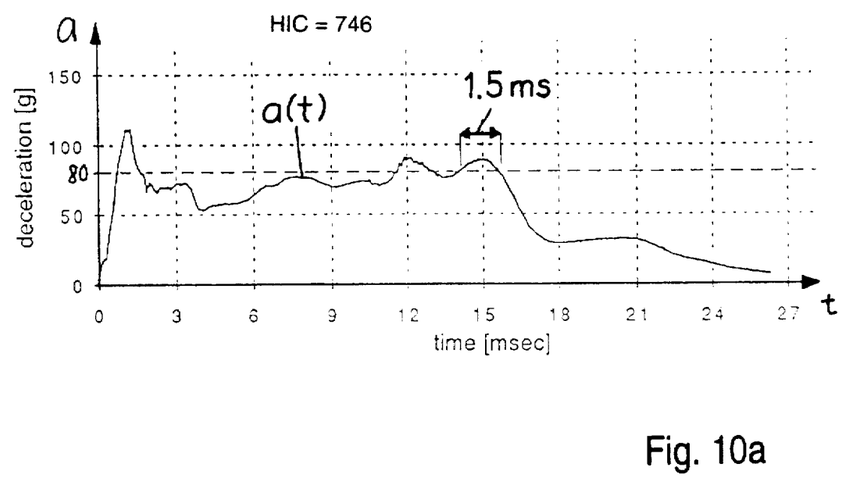
FIG. 10a graphically illustrates the results of an impact test on a wall element constructed in accordance with the invention.
Figure 10B:
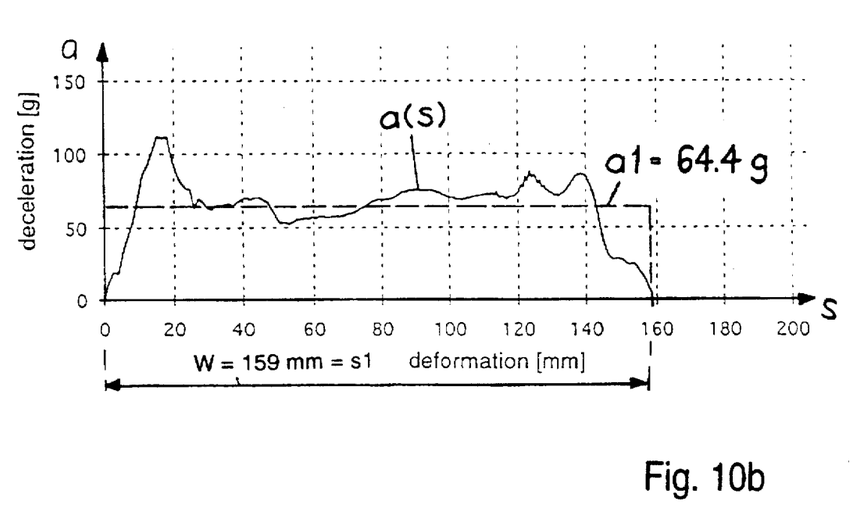
FIG. 10b graphically illustrates the results of the impact test as a function of the deformation path(s)
Figure 14A:
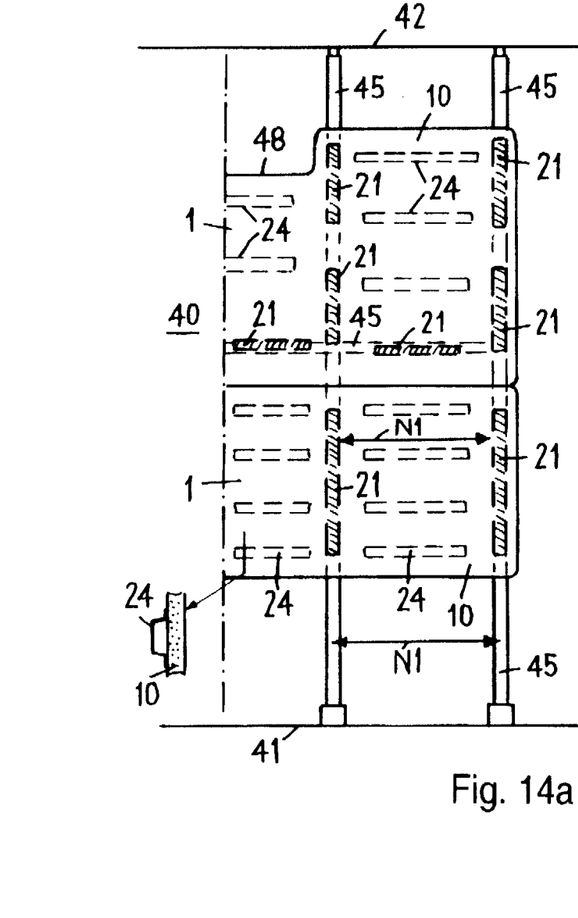
FIG. 14a illustrates a front view of an aircraft partition wall constructed of all impact elements in accordance with the invention.

FIG. 10a/b shows the measured data of an impact test with a dummy head weighing 5 kg on a wall according to FIG. 14 with a very high impact speed V of 51 km/h (=14.2 m/s). FIG. 10a shows the measured delay a(t) as a function of the time t and FIG. 10b the delay a(s) as a function of the deformation path s, a being given in units of g=9.81 m/s$^2$. The measurements show a very good behaviour of the impact wall. The head is uniformly decelerated to standstill over the shortest possible path. The maximum deformation path is W=159 mm according to FIG. 10b. The resulting calculated HIC (Head Injury Criterion) value is only 746. The delay path a(s) is very uniformly in the sought range of 70 to 80 g and according to curve a(t) there were only three small delay peaks with a >80 g and a duration of 1 to 1.5 ms.

According to relatively strict criteria laid down by the aeronautical regulations the following limiting conditions must be respected concerning the head impact:

a HIC value of max 1000, delay peaks with a >80 g for max 3 ms.

The measured values of the impact wall are consequently well below these limiting values.

Also a calculation comparison illustrates the very good test results of the wall according to the invention. For a constant delay a1 the HIC value is calculated to: HIC= $V*a1^{1.5}/9.81$ From this is calculated for a HIC value of 746 a constant delay of a1=64.4 g and from this $s1=V^2/2a$ for the total deformation path s1=159 mm.

This calculated minimum deformation path s1 corresponds to the effectively measured deformation path W=159 mm. For comparison purposes this calculated course a1 is also plotted in FIG. 10b. As can be seen, the measured course a(s) is very close to the calculated course with the minimum possible deformation path s1 and constant delay a1 for the same HIC values. For an impact speed of 15 m/s and with the limit value of HIC=1000, on the basis of the same calculation there is a constant delay of a1=75.3 g and a minimum delay path of s1=152 mm.

Thus, these impact conditions were attainable with a wall element according to the invention having a thickness D of only 16 to 17 cm, which is very close to the theoretical optimum given by the physical limits.

The most surprising aspect of the present invention is that with this novel, relatively simple, inexpensive, but precisely matched two-zone structure, such high efficiency levels can be reached that they even exceed those of expensive air bag systems which can only be used in a restricted form.

Figure 11A:
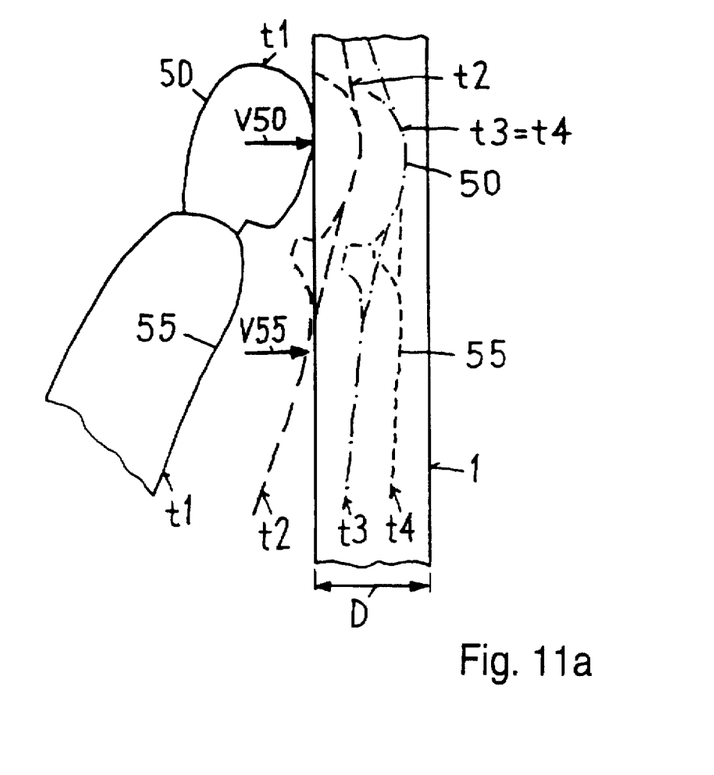
FIG. 11a diagrammatically illustrates an impact of two body parts on a wall impact element constructed in accordance with the invention.
Figure 11B:
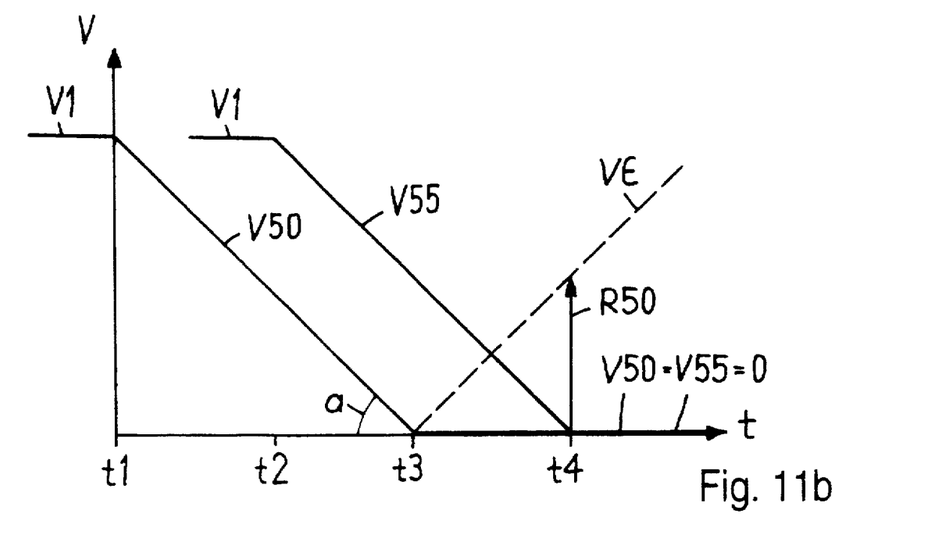
FIG. 11b graphically illustrates the forces on the wall impact element of FIG. 11a during impact.

FIGS. 11a and 11b illustrate the effectiveness of the impact wall 1 according to the invention or its non-elastic initial action. FIG. 11a illustrates diagrammatically the non-simultaneous impact of two body parts, i.e. the head 50 and chest 55 on the wall element 1. FIG. 11b shows the time pattern of the speed V(t) during the impact.

At time t1, the head 50 contacts the wall at a speed V1 and is subsequently decelerated with a constant delay a.

At time t2, the chest 55 also strikes the wall with the speed V1, when the head has already penetrated the wall.

At time t3, the head 50 has been decelerated to standstill (V50=0) and has covered its maximum deformation path (curve t3 in FIG. 11a). However, the chest has only been half decelerated (V55>0).

Only at time t4 has the chest 55 also been decelerated to standstill (V55=0). Both body parts 50 and 55 at least for a short time remain in this deformation end position (curve t4 in FIG. 11a). Thus, the speeds or velocities V50 and V55 remain 0.

With a purely elastic impact or shock behaviour of the wall the head would be hurled back in accordance with the line VE in FIG. 11b, so that at time t4, when the chest was stationary, it would already have attained a recoil or rebound speed R50. This would subject the back of the neck in very unfavourable manner to correspondingly high forces. However, the impact wall according to the invention is constructed in such a way that the deformations are at least temporarily, i.e. for more than the total impact time, longer than e.g. 0.1 s, substantially completely maintained and are also largely maintained even over a time lasting minutes.

An impacting human body is consequently not elastically hurled back and is consequently not exposed to further injury risks. It is also avoided that not simultaneously impacting body parts would be subject to strong and differing accelerations relative to one another and would consequently be exposed to additional elastic forces.

Figure 12:
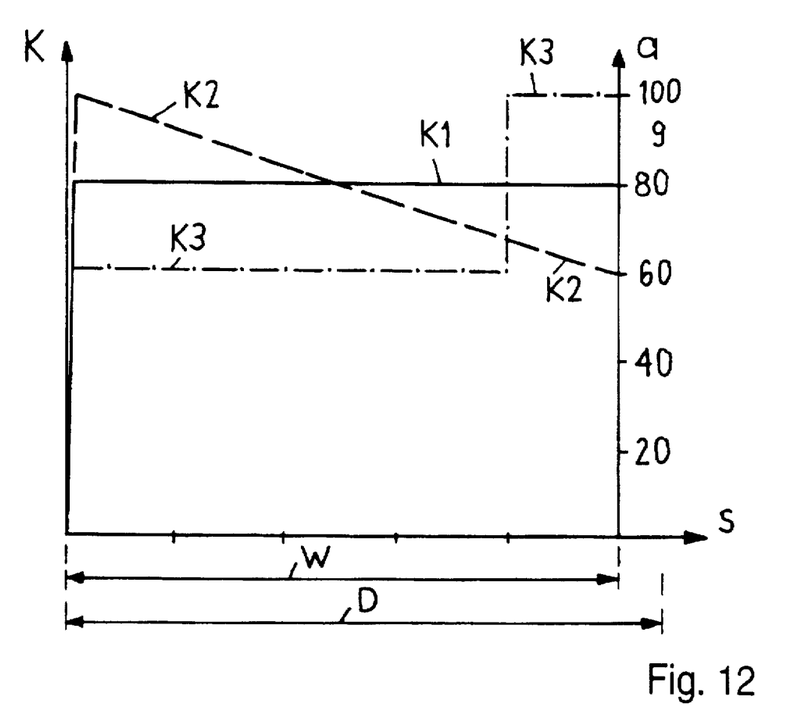

FIG. 12 shows diagrammatic examples of possible force courses K(s) over the deformation path s of impact wall elements. W is the maximum deformation path of a wall with a thickness D. For a given weight M of a body part, e.g. the head, the force K is proportional to the delay a: K=M*a with a constant delay a over the deformation path W, the impact or shock energy absorbed by the wall is E=K*s= M*a*W.

FIG. 12 shows three force courses K1, K2, K3(s) over the maximum deformation path W.

K1 passes over the entire deformation range with a constant delay of 80 g. With a maximum permitted delay of 80 g, this gives a maximum possible energy absorption of E=80 units.

At K2(s) the delay a linearly falls from initially 100 g to 60 g at the end of the deformation path W. The energy absorption is then also E2=80 units.

At K3(s) the first 80% of the path is covered with a delay of a 60 g and the remaining 20% with 100 g, which gives an energy absorption of E3=68 units.

The course K2(s) can be particularly advantageous for high head impact speeds, because a lower HIC value is obtained than with a constant delay over the same deformation path W according to K1. This is because initially at a higher speed a local delay peak in the wall structure would be more rapidly traversed than later and deeper in the wall and with a correspondingly lower speed (according to dt=ds/V).

The design of the wall according to K3 has a somewhat lower energy absorption than at K1 and K2, which could e.g. correspond to the following:

Impact shocks are to be intercepted relatively gently up to an impact energy of 48 units (=80%*60 g). However, there is an additional reserve of 20 units for very improbable cases of an impact with a correspondingly higher energy. The last 20% of the deformation path W with the acceleration a=100 g consequently act as an emergency reserve. This can be constructionally implemented with an impact wall element in which the first and second zones (10 and 20) correspond to said 80% of the deformation path and where additionally a third, harder zone is inserted between the second zone and the fixed substrate 5 with the remaining 20% of the deformation path (cf. FIG. 1).

The high effectiveness of the wall structure according to the invention will be illustrated by a further example of a very thin impact wall element. A wall element with a thickness D of only 3 cm and a corresponding deformation range W of at least 2.5 cm gives the following impact results. With a design for a constant delay of a=100 g, it is possible to intercept an impact speed V of approximately 7 m/s and with a reduced injury risk corresponding to a HIC value of 700. This very good result is to be compared with an undamped, hard head impact, which as from V=5 m/s can give very serious injuries.

The following procedure can be used for designing an impact wall for a given function.

1. Determination of the limiting conditions

These are in particular the maximum impact speed V1, the space available for the layer thickness D and the nature of the body to be absorbed or intercepted, i.e. the body parts, their weight, as well as the shape and size of the impact surfaces and the permitted forces and delays. From different use areas such as air travel and crash tests carried out in the car industry standards and limit values have been calculated. These give measured standards and limit values for the permitted forces and accelerations for different body parts and different injury risk stages.

2. From these limiting conditions concerning forces, impact surfaces, weights and permitted delays the wall is firstly designed for a constant desired delay a corresponding to curve K1 of FIG. 12.

3. Starting with this constant desired delay or deceleration a, according to the further limiting conditions of the force course as in examples K2 and K3 of FIG. 12, as well as according to FIG. 8, further optimization can take place. The thicknesses D1 and D2 of both zones 10 and 20 are optimized, so as to attain a maximum deformation path with a given total thickness D. For example in zone 10 with D1=15 mm, W1=10 mm and in zone 20 with D2=85 mm, W2=80 mm, which in the case of a total thickness of D=100 mm there is a very large deformation path W of 90 mm.

4. Following the design of the wall according to estimate calculations, the static deformation behaviour Ks can be measured by relatively simple tests. In particular, the uniformity of the deformation course over the wall thickness, as illustrated in FIGS. 3 and 4, is determined and optimized. For higher impact speeds, it is also necessary to determine the influence of the mass inertia forces Km. This can once again firstly take place with rough estimate calculations and can then be verified with a dynamic test (FIG. 10). On the basis of said measured data the further optimization of the wall can take place in iterative steps with calculations and simple static measurements.

As is shown by the example of FIG. 10, with the impact wall according to the invention having a relatively simple and inexpensive structure, it is possible to obtain a very high protective action in wide use fields, which come very close to the physical limits. The known, complicated and costly systems, such as the air bag can only be used in restricted form and also require greater impact paths. Simpler systems, such as e.g. the use of foam cushions give rise to a much inferior force course with correspondingly higher stress or loading values for the human body.

Figure 13:
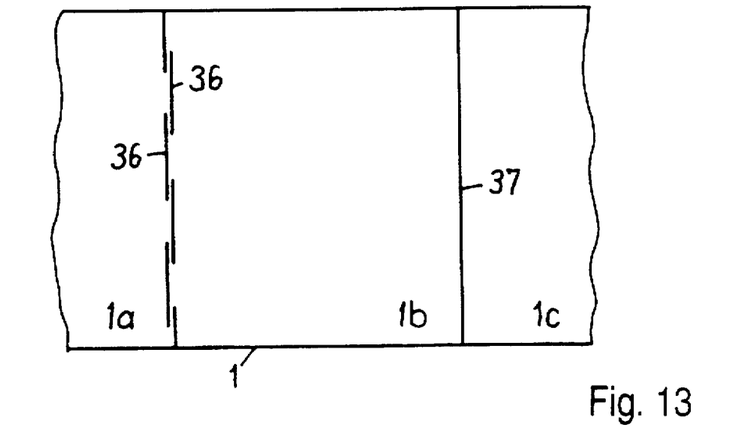
FIG. 13 illustrates a plurality of impact wall elements arranging in side-by-side relation.

FIG. 13 illustrates the subdivision of a large wall element into sectors 1a, 1b and 1c. In the case of large wall surfaces, which can extend over more than e.g. 1 m, by a subdivision into sectors, by means of interruptions spaced at e.g. 50 to 80 cm, it is possible to achieve a uniform deformation characteristic over randomly large surfaces. A partition wall placed in front of a row of seats can e.g. for each seat have a sector 1a, 1b, 1c. This wall subdivision can e.g. be formed by displaced slots 36 in one or both cover plates 11, 12 or by an interruption, i.e. separation 37 of the lower, upper or both cover layers of the cover plate. This prevents the occurrence of excessive membrane forces in the interior of large surfaces. Through the extent of the subdivision, the membrane force transfer from one sector to the next can be set at random from 0 to 100%. The arrangement of the spacing elements 21 and their mutual spacings is then correspondingly adapted. Examples of arrangements with several individual wall elements 1 are shown in FIGS. 15 and 16.

Figure 14B:
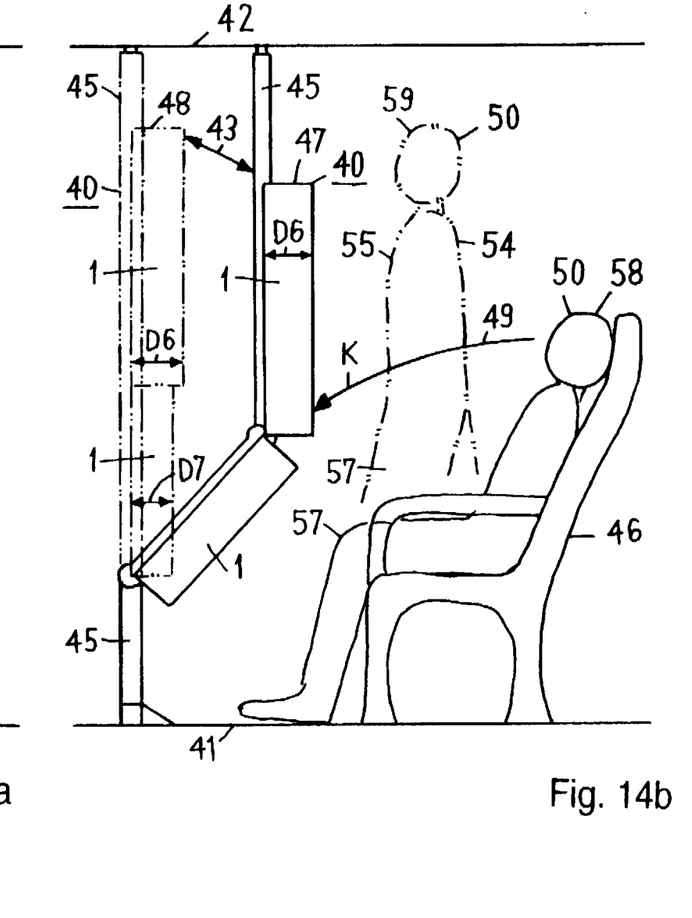

FIG. 14a and 14b show an embodiment in the form of a vehicle or aircraft partition wall 40. The partition wall 40 with a stiff frame formed from aluminium sections 45 fixed at the top on the roof 42 and at the bottom on the floor 41 of the vehicle can be adjusted in direction 43. It comprises two wall elements 1, which are supported on the frame 45. The spacing elements 21 are fixed to the frame sections 45, which are relatively far apart, so that there is a correspondingly large distance N1 between the spacing elements 21. However, so as to still obtain a uniform deformation characteristic over the entire wall surface, between the spacing elements are fitted in a netting-like arrangement to the cover plate additional reinforcing sections 24. These reinforcing or stiffening sections 24 on the one hand themselves absorb deformation energy and on the other they also transfer impact forces to the spacing elements 21. They are e.g. made from 0.5 mm thick, U-shaped aluminium sections. The upper wall element 1 of the partition wall here has a greater thickness D6 of e.g. 13 to 16 cm, whereas the smaller thickness D7 of the lower wall element is e.g. 10 to 12 cm. This corresponds to the different requirements concerning the impact behaviour of the two wall elements. Thus the upper impact wall is mainly intended for intercepting sensitive body parts, particularly the head 50, but also the upper body 55, whereas the lower element 1, is e.g. designed for the less sensitive leg area 57 or, as a function of the circumstances, for lower impact speeds, loads and stresses. In the angled position 47, the partition wall is fitted in front of seats 46 with passengers 58, which are secured with a pelvic belt. In the case of a violent impact, e.g. an emergency landing the head 50 is accelerated in direction 49 until it strikes the upper wall element 1. In another use of the partition wall in the vertical position 48, it is possible to absorb in the best possible manner the impact of a standing passenger 59. An optimum intercepting action is also achieved in the case of a non-vertical impact (FIG. 7). The partition wall 40 is shown in a front view in FIG. 14a and in a side view in FIG. 14b.

Figure 15:
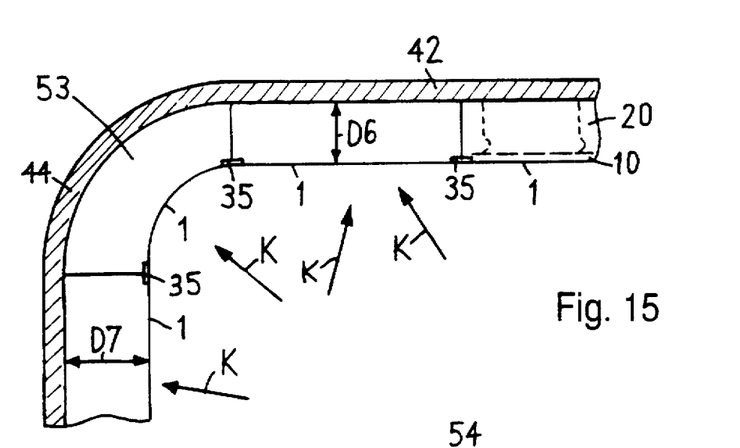
FIG. 15 illustrates a cross-sectional view of a modified impact wall element constructed in accordance with the invention.
Figure 16:
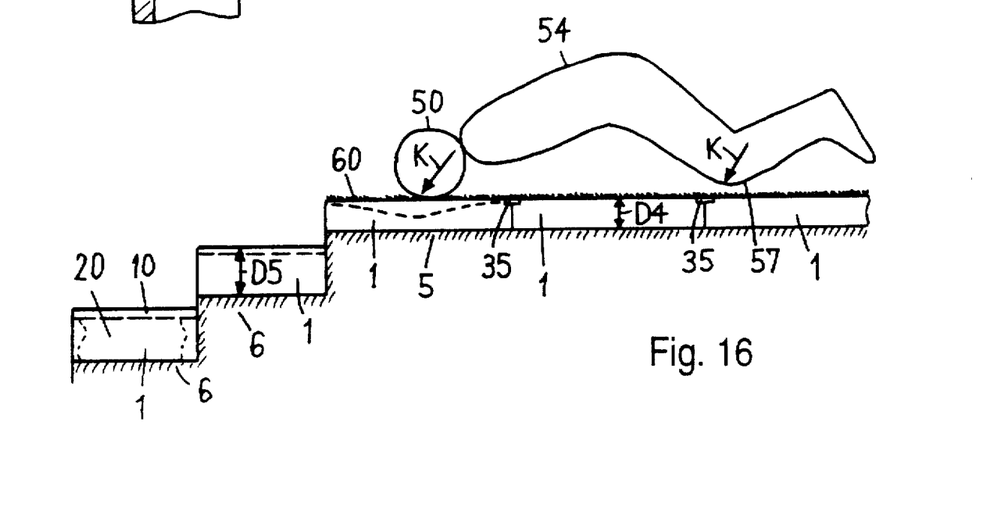
FIG. 16 illustrates a plurality of impact elements used as floor and stair elements therein.

FIG. 15 shows a further use of the impact wall element according to the invention as a shock-absorbing lining of exposed points of a vehicle interior. In this way, it is possible to also absorb lateral impacts or shocks (e.g. in the case of a side or lateral impact) or those relative to the vehicle roof (e.g. on turning over). This is illustrated here in a partial view with three different wall elements 1.

On the vehicle side wall 44 is supported a wall element with a thickness D7, whilst to the roof 42 is fitted a wall element with a limited thickness D6 (corresponding to deeper requirements). The transition between these two wall elements is formed by a third element 53, which is correspondingly bent. This is an example of a shell-like or curved construction of the wall element 1 according to the invention. As a function of the particular requirements the layer thicknesses can e.g. be as follows: D6=4–8 cm, D7=6–10 cm. The wall elements are e.g. interconnected by connecting elements 35 with a relatively small, meterable force transmission or transfer.

The impact wall elements according to the invention can be used in numerous fields. These extend from the transportation sector with aircraft and land vehicles to stationary uses in buildings. In the transport field there is an increasing need for a better protection of the occupants of vehicles. Apart from the two hitherto conventional systems constituted by foam cushions and air bags, a further use range is provided. On the inexpensive side for limited demands, plastic foam cushions are nowadays widely used in the interior. For high demands, increasing use is being made of air bag systems and soon they will also be used for side protection. However, they are very expensive and can only be used in restricted form, due to their complicated activation and release control.

The novel impact elements can, with a relatively limited cost and very high efficiency, cover much broader ranges of use. The impact wall elements are generally usable at exposed points in a vertical, horizontal or inclined position, as well as in a flat or curved construction for the protection of strapped in and unsecured passengers in vehicles, such as can occur with high positive or negative accelerations in the direction of travel (impacts on the front or rear of the vehicle) or laterally, e.g. in the case of turning over or a lateral impact of the vehicle.

In the case of aircraft and land vehicles the impact elements can be used in the interior bulkheads (front, rear and subdivisions), side walls, supports on components, boxes, roof linings, etc. The impact elements can be used in passenger vehicles such as aircraft, buses, trains, trams, etc., as well as in individual vehicles and in particular e.g. in mobile homes, combi-vehicles, caravans, campers, etc. where an impact protection for passengers who are not strapped in is still only used to a limited extent.

Uses in stationary installations in buildings occur where there is a risk of persons striking against fixed objects, e.g. in hospitals, rest homes, old peoples homes, etc. The impact elements are here usable as fall-damping floor coverings and stair coverings, or on side walls in protected rooms of psychiatric institutions.

There can be very varied quantitative requirements for these different uses. In the transport sector, the impact elements are designed for high delay or deceleration values, e.g. 80 g and a relatively high speed range of up to 15 m/s, whereas in the stationary sector there are much lower speeds of e.g. 5 to 8 m/s and also lower delay values of e.g. 30 to 50 g. However, the general characteristics of the impact elements are suitable for all uses and their particular advantages are:

clearly defined, high initial deformation absorption force,
uniform, clearly defined high deformation force (or delay) in the deformation range,
a maximum deformation path W, relative to the wall element thickness D,
extensive plastic deformation, i.e. brief permanent deformation during an impact and no rebound of the body,
good adaptation of the impact surface to the shape of the body.

One particular use in stationary installations is illustrated by the fall-damping floor covering of FIG. 16. Particularly for elderly people injuries caused by falling on the floor represent a very important hazard, being caused by unsteady walking and possible weakness attacks, as well as by a weaker bodily constitution and more brittle bones, so that the injury risks are increased in the case of a fall.

Therefore elderly people have a fear of falling and the consequent injuries. This also leads to increased personnel requirements to take care of them or alternatively they prematurely have to enter old peoples homes. The fall-damping floor covering according to FIG. 16 offers a good solution for such problems. It comprises individual wall element plates 1, which are so connected by connecting elements 35 that there is only a limited transfer of the membrane forces of one plate to the next one. The wall element plates on the flat floor 5 have a smaller thickness D4 than the plates with a thickness D5 laid on stairs 6. The impact in the case of a fall, e.g. on the head 50 and the knee 57 due to the tripping over of a person 54, is indicated here by the non-vertical impact forces K. A fall-damping floor covering in the form of known elastomer plates always gives a certain sinking in in the case of loading. This makes walking more difficult and gives the walker an unsure feeling. The wall elements according to the invention used as floor plates are so designed that they can be walked on without any detection of sinking in, i.e. the static initial deformation force is precisely designed for this function. In the case of a fall and the resulting permanent deformation, it is easily possible to replace such plates.

From the possible height of fall of the head on the flat floor and on stairs, values for the possible impact speeds of approximately 5 to 8 m/s are obtained. From this is derived the resulting, necessary deformation path W. With a constant delay a of 30 to 50 g $W=V^2/2a$ giving deformation paths of $W=4$ to 10 cm. Based on a head weight of 5 kg, in the case of a delay or deceleration of $a=40$ g, there are initial deformation forces of 2000N and relative to a 1 $dm^2$ impact surface this gives a surface loading of 20N/$cm^2$. Thus, the maximum loading for walking for a 1 $dm^2$ contact surface (flat, wide shoe soles) would be a weight corresponding to max 200 kg without any deformation of the floor element. A lightweight carpet covering 60 on the floor element can lead to additional improvements.

As stated, a fall-damping floor made from wall elements according to the invention can be designed in optimum manner for a desired use and even for a specific person. As a result of the limited weight and simple construction this not only offers a very efficient, but also a cost-effective solution of the problems.

What is claimed is:

1. An impact element comprising
   a first zone having a lightweight deformable cover plate including a thin outer cover layer, an inner cover layer and a deformable support core with cavities therein sandwiched between said outer cover layer and said inner cover layer; and
   a second zone having a plurality of plastically deformable spacing elements discretely spaced and extending from against said inner cover layer of said first zone to abut a fixed substrate to transmit impact forces on said first zone to the substrate while plastically deforming, said second zone having a thickness at least twice the thickness of said first zone.

2. An impact element as set forth in claim 1 characterized in being crushable to at least 90% of the total thickness of said first zone and said second zone.

3. An impact element as set forth in claim 1 characterized in having a dynamic deformation resistance of from 2 to 4 kN for a spherical pressure surface of a diameter of 15 centimeters.

4. An impact element as set forth in claim 1 characterized in having a dynamic deformation resistance of constant value over a range of deformation of said zones after an initially high value.

5. An impact element according to claim 1, characterized in that the thickness D2 of the second zone is 3 to 10 times the thickness D1 of the first zone.

6. An impact element according to claim 1, characterized in that the weight of the cover plate is between 2 and 3.5 kg/m².

7. An impact element according to claim 1, characterized in that the thickness D1 of the cover plate (10) is between 8 and 20 mm.

8. An impact element according to claim 1, characterized in that the cover layers (11, 12) are made from aluminium.

9. An impact element according to claim 1, characterized in that the cover layers (11, 12) have a thickness of 0.4 to 0.6 mm.

10. An impact element according to claim 1, characterized in that the support core (13) is made from a foam material.

11. An impact element according to claim 1, characterized in that the support core (13) has a specific density of 40 to 80 kg/m³.

12. An impact element according to claim 1, characterized in that the second zone (20) has additional force-distributing stiffening sections (24), which are fitted to the cover plate (10).

13. An impact element according to claim 12, characterized in that the arrangement of the spacing elements (21) and any stiffening sections (24) in the second zone forms a junction-free, netting-like structure (25).

14. An impact element according to claim 1, characterized in that the spacing elements have a precompression bend (22).

15. An impact element according to claim 1, characterized in that the spacing elements (21) comprise wall sections (21.1) substantially perpendicular to the cover plate.

16. An impact element according to claim 1, characterized in that the spacing elements (21) are sheet-like (21.5), arcuate (21.6), tubular (21.8), columnar (21.9), cylindrical or conical (21.11).

17. An impact element according to claim 1, characterized in that the spacing elements are made from 1 to 2 mm thick aluminium sheet material.

18. An impact element according to claim 1, characterized in that the cover layers (11, 12) and/or spacing elements (21) are made from fibre-reinforced plastic.

19. An impact element according to claim 1, characterized in that the thickness D2 of the second zone is 5 to 18 cm.

20. An impact element according to claim 1, characterized in that the second zone has a weight of 1 to 3 kg/m².

21. A wall comprising a plurality of vertically disposed impact elements disposed in side-by-side relation, each impact element including a first zone having a lightweight deformable cover plate including a thin outer cover layer, an inner cover layer and a deformable support core with cavities therein sandwiched between said outer cover layer and said inner cover layer; and a second zone having a plurality of plastically deformable spacing elements discretely spaced and extending from against said inner cover layer of said first zone to abut a fixed substrate to transmit impact forces on said first zone to the substrate while plastically deforming, said second zone having a thickness at least twice the thickness of said first zone.

22. In combination, a frame defining a fixed substrate; and at least one impact element mounted on said frame, a first zone having a lightweight deformable cover plate including a thin outer cover layer, an inner cover layer and a deformable support core with cavities therein sandwiched between said outer cover layer and said inner cover layer; and a second zone having a plurality of plastically deformable spacing elements discretely spaced and extending from against said inner cover layer of said first zone and abutting said fixed substrate to transmit impact forces on said first zone to said substrate while plastically deforming, said second zone having a thickness at least twice the thickness of said first zone.

23. A floor comprising a plurality of horizontally disposed impact elements, each impact element including a first zone having a lightweight deformable cover plate including a thin outer cover layer, an inner cover layer and a deformable support core with cavities therein sandwiched between said outer cover layer and said inner cover layer; and a second zone having a plurality of plastically deformable spacing elements discretely spaced and extending vertically from against said inner cover layer of said first zone to abut a fixed substrate to transmit impact forces on said first zone to the substrate while plastically deforming, said second zone having a thickness at least twice the thickness of said first zone.

* * * * *

UNITED STATES PATENT AND TRADEMARK OFFICE
CERTIFICATE OF CORRECTION

PATENT NO. : 5,749,193
DATED : May 12, 1998
INVENTOR(S) : Peter Bucher

It is certified that error appears in the above-identified patent and that said Letters Patent is hereby corrected as shown below:

On the title page, item [57],

In the Abstract-

Line 7, change "discreet" to -discrete-

Column 14, line 18, before "a first" insert -said impact element having-

Signed and Sealed this

Twentieth Day of April, 1999

Attest:

Q. TODD DICKINSON

*Attesting Officer*　　Acting Commissioner of Patents and Trademarks